June 30, 1959 H. J. SEAMAN 2,892,558
VEHICLE MOUNTED APPARATUS
Filed July 6, 1954 5 Sheets-Sheet 1

INVENTOR
HARRY J. SEAMAN
BY Christopher L. Waal
ATTORNEY

June 30, 1959 H. J. SEAMAN 2,892,558
VEHICLE MOUNTED APPARATUS
Filed July 6, 1954 5 Sheets-Sheet 2

INVENTOR
HARRY J. SEAMAN
BY Christopher L. Waal
ATTORNEY

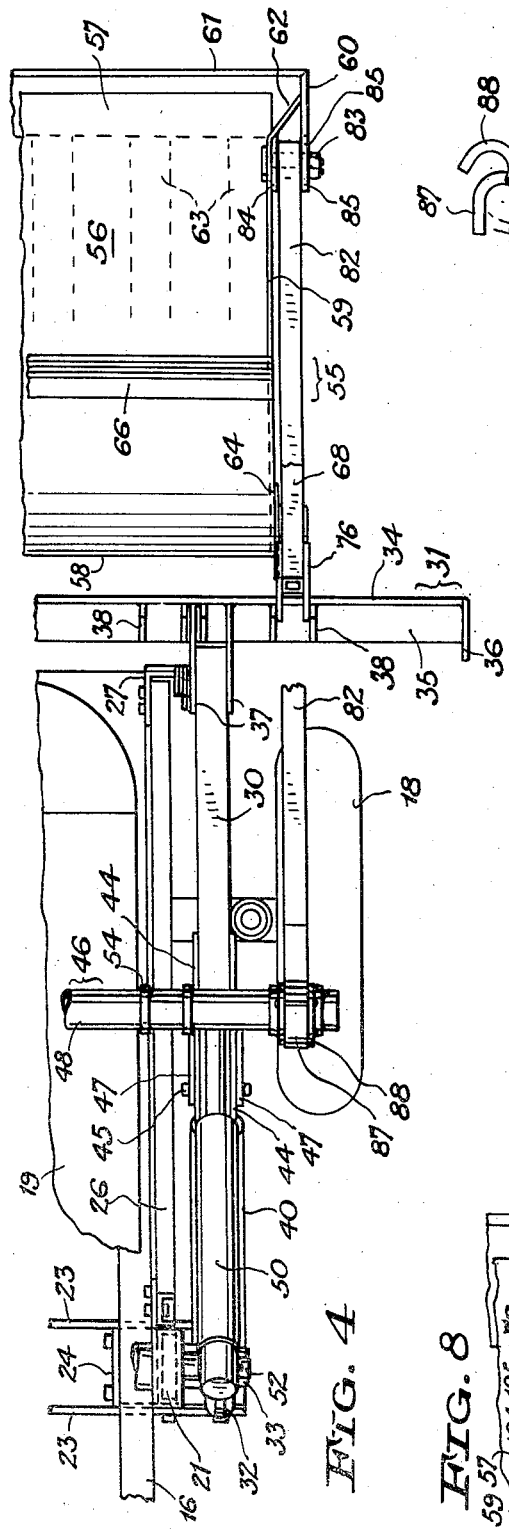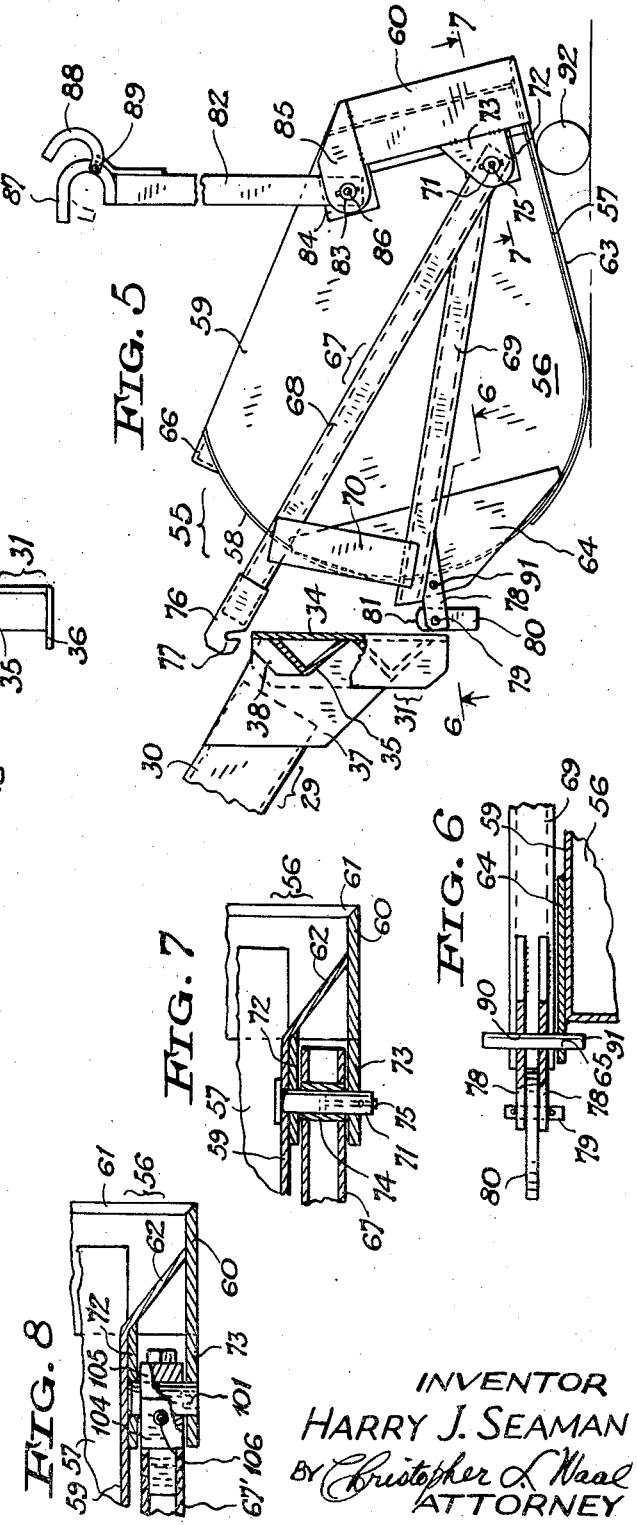

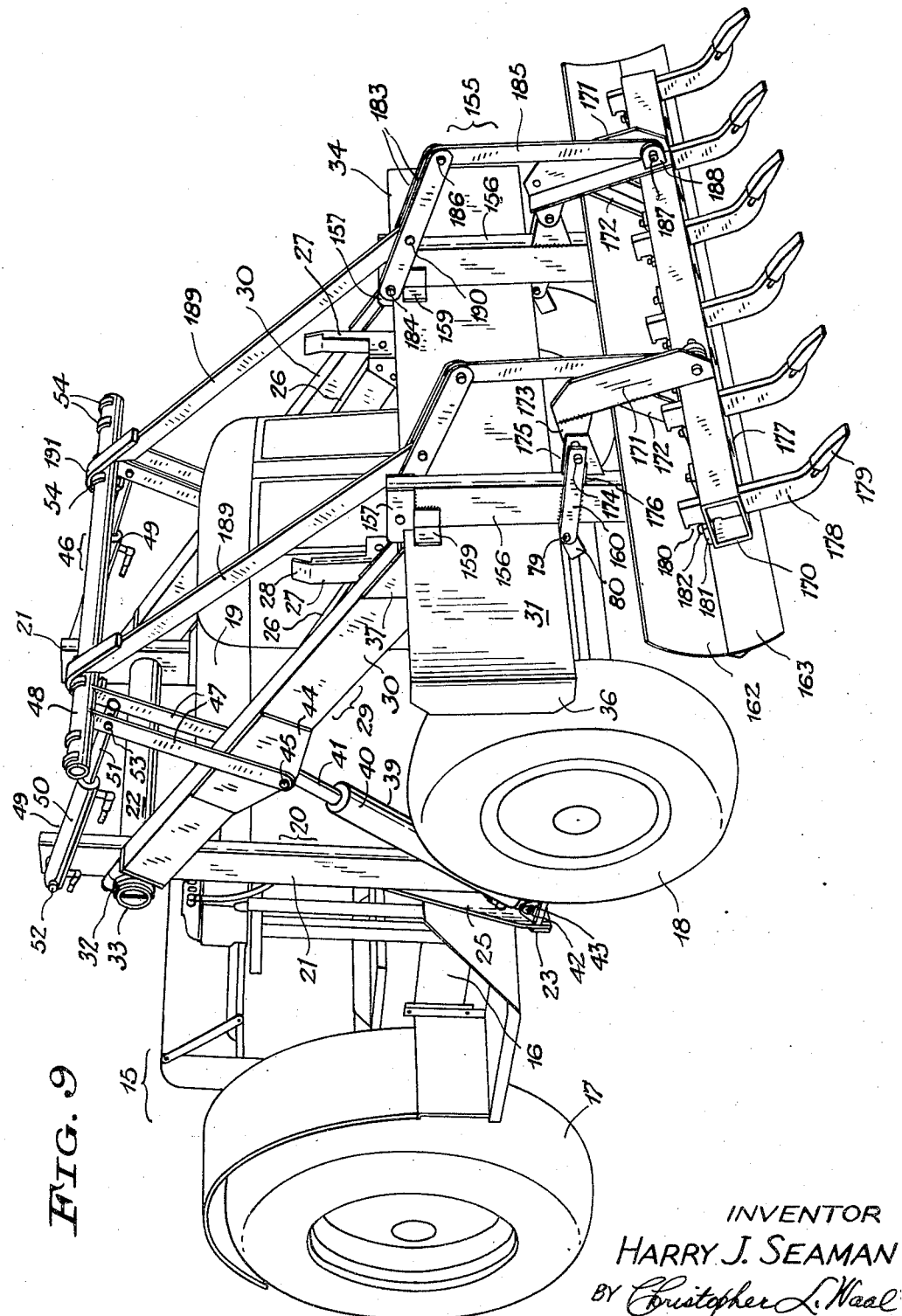

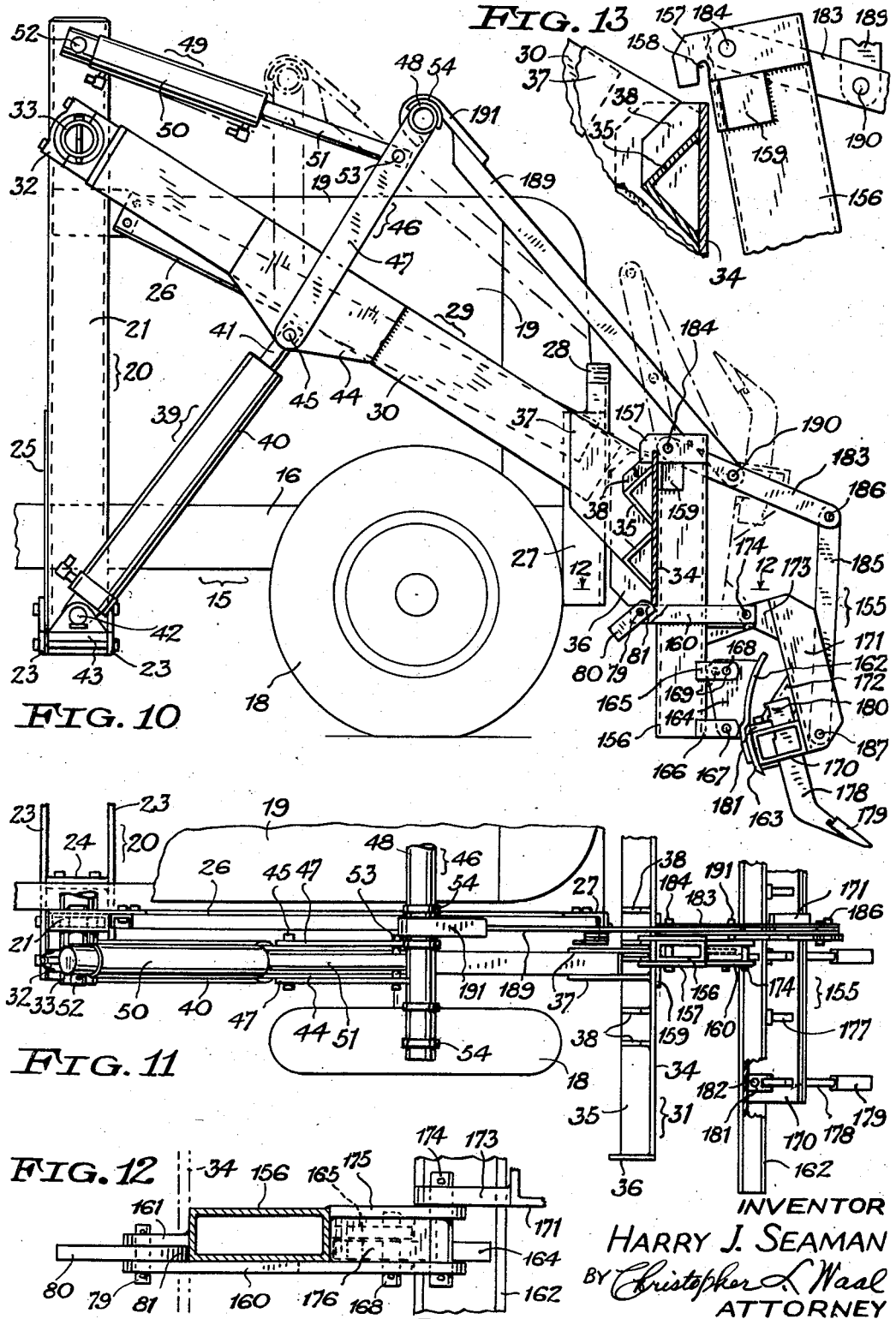

United States Patent Office 2,892,558
Patented June 30, 1959

2,892,558

VEHICLE MOUNTED APPARATUS

Harry J. Seaman, Milwaukee, Wis., assignor, by mesne assignments, to Seaman-Andwall Corporation, Milwaukee, Wis., a corporation of Wisconsin Application July 6, 1954, Serial No. 441,379

5 Claims. (Cl. 214—140)

The present invention relates to vehicle-mounted apparatus, such as for material handling and road working.

An object of the invention is to provide an improved implement attachment which will facilitate mounting of a material loader or other implement on a motor-driven vehicle, such as a tractor, and which will permit ready control of the implement by the operator of the vehicle.

Another object is to provide an implement attachment including improved means by which various implements, such as material loaders and road-working devices, may be interchangeably mounted on the vehicle.

Still another object is to provide an implement attachment including novel operating linkage for controlling the interchangeable implements.

A further object is to provide a vehicle-mounted loader including a tiltable load carrier or bucket which is supported and manipulated at the front region thereof, so as to facilitate unloading into a truck body or other receptacle.

A still further object is to perfect details of construction generally.

The invention further consists in the several features hereinafter described and claimed.

In the accompanying drawings, illustrating certain embodiments of the invention, Fig. 1 is a perspective view of a tractor-mounted implement of the invention incorporating a detachable loader unit;

Fig. 4 is a fragmentary top view of the implement of Fig. 1;

Fig. 5 is a side view of the loader implement as it appears in readiness to be attached to the tractor;

Fig. 6 is a detail sectional view taken generally on the line 6—6 of Fig. 5;

Fig. 7 is a detail sectional view taken generally on the line 7—7 of Fig. 5, showing a pivotal bucket support;

Fig. 8 is a detail sectional view similar to Fig. 7, but showing a modified form of bucket support;

Fig. 9 is a perspective view of a tractor-mounted implement of the invention incorporating a bulldozer and scarifier unit;

Fig. 10 is a side elevational view of the tractor-mounted implement of Fig. 9, a lowered position of a scarifier being shown in full lines, and a raised position of the scarifier being shown in broken lines;

Fig. 11 is a fragmentary top view of the implement of Fig. 9;

Fig. 12 is a detail sectional view taken generally on the line 12—12 of Fig. 10;

Fig. 13 is a fragmentary detail sectional elevational view showing the bulldozer attachment in readiness to be secured to the tractor.

Figure 1:
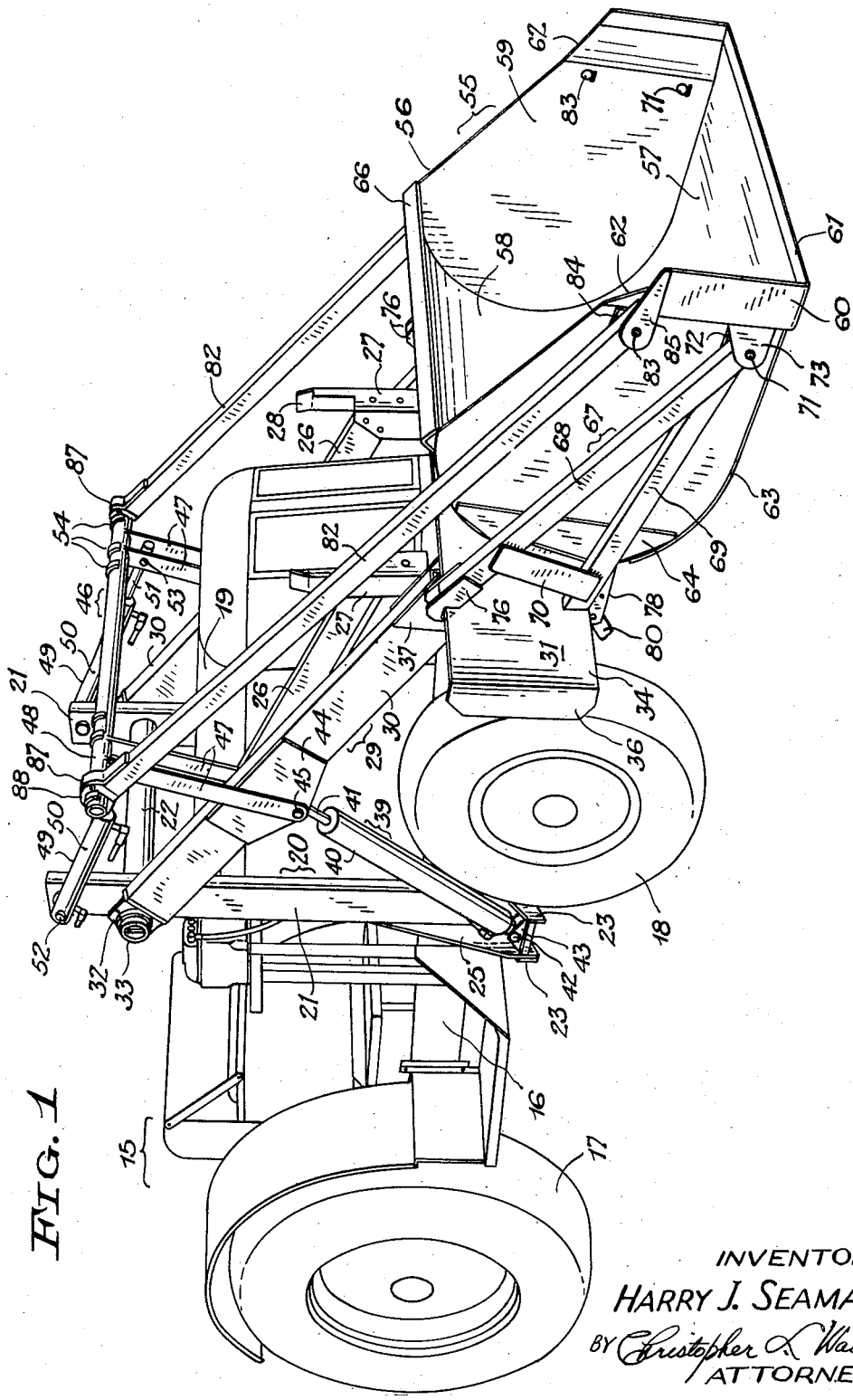

In the drawings, 15 designates a motor-vehicle, here shown to be a tractor having a chassis including side frame members 16, rear traction wheels 17, and steerable front wheels 18. The tractor is here indicated to be of the front-engine type and is provided with an engine hood 19.

Referring to the embodiments of the invention shown in Figs. 1 to 13, a mounting or supporting structure is secured to the tractor frame and comprises a rigid rectangular mounting frame 20 disposed rearwardly of the front wheels of the tractor and having opposite side uprights or pillars 21, a tubular upper bar or beam 22, and spaced lower cross bars 23. The upper cross bar 22 extends over the tractor hood, and the lower cross bars 23 extend under the tractor side frame members 16 and are rigidly secured to these frame members, as by hanger plates 24, Fig. 4. The uprights 21, which are of hollow rectangular cross-section, laterally abut the outer sides of the tractor side frame members and have their lower portions secured between the projecting ends of the lower cross bars 23. The uprights are laterally braced by gusset plates 25 secured thereto and to the rear lower cross bar 23, and are further braced by forwardly and downwardly sloping channel bars 26 the rear ends of which are secured to the uprights, and the front ends of which are connected to short vertical posts 27 rigidly secured to the front corner portions of the tractor frame, the posts forming side guards and having inclined inturned top wings 28.

A vertically swingable boom or lift frame 29 is pivotally mounted at its rear end portion on the supporting frame 20, and comprises a pair of parallel side arms 30 the front ends of which are rigidly secured to a cross member 31. The side arms 30 are of hollow rectangular cross-section and at their rear ends have bearings 32 disposed at the outer sides of the upper end portions of the uprights 21 and carried on horizontally aligned pivot-forming extensions 33 of the tubular cross bar 22. In the lower position of the boom, the front cross member 31 thereof is spaced a short distance forwardly of the front of the tractor frame.

The boom cross member 31 comprises a flat metal cross plate 34 with a pair of horizontally extending angle bars 35 welded to its rear face, the ends of the plate having rearwardly projecting flanges 36. The plane of the cross plate 34 is approximately vertical when the boom is in its lowermost position. The hollow side arms 30 of the boom are provided at their front ends with welded vertical cheek plates 37 the front edges of which are welded to the front cross plate 34 and to the angle bars 35. A series of vertically extending implement positioning blocks or lugs 38 are welded to the rear face of the cross plate 34 near the top edge of the plate. The front cross plate of the boom or lifter frame is adapted to detachably carry thereon any one of a number of interchangeable implements, as hereinafter described.

The pivotally mounted side arms 30 of the boom are adjustably elevated by respective hydraulic rams or actuators 39 each comprising a cylinder 40 and a piston rod 41. Each cylinder 40 has its lower end pivotally mounted at 42 on a bracket 43 secured between the projecting ends of the lower cross members 23 of the mounting frame. The upper ends of the piston rods 41 extend between respective pairs of vertical cheek plates 44 rigidly secured to the opposite sides of the boom arms, and are pivoted thereto by horizontally aligned pins 45, the axis of the pins being parallel to the pivotal axis of the boom and being under the bottom faces of the boom arms.

A rocker frame 46 is swingably supported on the boom side arms 30 and comprises spaced pairs of arms 47 the upper ends of which are welded to a tubular cross bar 48 extending above the engine hood 19. The lower ends of the rocker frame arms flang the boom arm cheek plates 44 and are pivotally secured thereto, as by means of the pivot pins 45. The rocker frame is reciprocable in a forward and rearward direction by a pair of double-acting link-forming hydraulic rams or actuators 49 each including a cylinder 50 and a piston rod 51. The rear ends of the cylinders 50 are pivotally secured to the upper end portions of the uprights 21 by horizontally aligned pivot pins 52 spaced above the boom arm pivots 33. The piston rods 51 have their front ends extending between the respective pairs of rocker frame arms 47 below the rocker frame cross bar 48 and are pivotally secured to these arms by pivot pins 53. The rocker frame cross bar 48 is provided at its upper side with several sets of spaced shoulder-forming saddle blocks 54 which serve to position the rear ends of link members hereinafter described.

Referring to Figs. 1 to 7, the boom or lifter frame 29 detachably supports thereon a load-handling implement or unit 55 including a tiltable load carrier here shown to be a loader bucket 56. The bucket has a flat bottom wall 57 and a semi-cylindrical rear wall 58 formed by a curved metal plate, and has parallel vertical side walls 59 welded to the opposite side edges of the plate, the side walls having forwardly and downwardly sloping top edges. The open front of the bucket is formed by a heavy-gage U-shaped plate 60 welded in place and presenting front cutting edges 61, and the side walls of the bucket have forwardly divergent front portions 62 welded to the inner faces of the side portions of the U-shaped plate. The bottom wall of the bucket is provided at its underside with longitudinally extending wear plates 63, and the bucket side walls are provided at their rear portions with vertical wear plates 64 rearwardly projecting parts of which have horizontally aligned openings 65, Fig. 6, for a purpose hereinafter described. The forwardly projecting upper edge of the bucket rear wall is reinforced by an angle bar 66.

At opposite sides of the bucket, near the front and bottom thereof, are pivotally secured the front ends of bucket-supporting arms 67 of generally triangular shape formed of forwardly converging upper and lower members 68 and 69 of hollow rectangular cross-section joined at their rear portions by welded tie plates 70. Each pivotal connection to the bucket comprises a headed pin 71 passing through the side wall of the bucket and a reinforcing plate 72, and also through an outboard ear 73 welded to the rear edge of the bucket front member 60 in parallel relation to the bucket side wall, the front end of the bucket supporting arm 67 being interposed between the ear and the bucket side wall reinforcing plate 72 and having a fixed bushing 74, Fig. 7, in which the pin 71 is journalled. The outer end of the pin 71 carries a lubricating fitting 75.

To the rear end of each upper arm member 68 are welded two vertically disposed parallel hook plates 76 having respective downwardly opening slots or notches 77 adapted to receive the upper edge portion of the front cross plate 34 of the boom, the hook plates being laterally positioned by some of the positioning lugs 38 on the cross plate. The rear end of the lower arm member 69 is adapted to abut against the front face of the cross plate 34 near the lower portion thereof and is provided with a pair of rearwardly projecting vertical plates 78 which extend below the cross plate and carry a cross pin 79. A latch lever 80 disposed between each pair of plates 78 is pivotally carried on the pin 79 and is gravitationally urged to latching position, the latch lever having a rounded cam-forming end 81, Fig. 5, engageable with the bottom edge of the boom cross plate 34. When the bucket-supporting arms 67 are engaged on the cross plate they form, in effect, front extensions of the swingable boom or lift frame, the bucket being tiltable forwardly and rearwardly on the front ends of these arms.

The bucket 56 is further supported by a pair of link bars 82 by which the bucket is tiltable to selected positions. Each link bar 82 is of hollow rectangular cross-section and has its front end pivotally secured to a side wall of the bucket near the front thereof at a point spaced above the lower pivot pin 71 and in the same manner as the arms 67. The pivotal connection for the link bar comprises a headed pin 83 passing through the side wall of the bucket and a reinforcing plate 84 thereon and also through an outboard ear 85 welded to the upper end of the bucket front member 60 in parallel relation to the bucket side wall, the pivoted front end of the link bar being interposed between the bucket side wall and the adjacent ear. The outer end of each pin 83 has a lubricating fitting 86. The upper end of each link bar 82 has a downwardly facing hook 87 which is engaged over the tubular cross bar 48 of the swingable rocker frame 46, the hooked end being laterally confined between a pair of the saddle blocks 54. In some instances, each of the link bar ends is further provided with one or more hook-shaped locking levers 88, Figs. 2 and 5, pivoted at 89 and engageable under the rocker frame cross bar. The bucket pivot pin 83 is slightly forward of the pivot pin 71 when the bucket is level, and the distance between these pivot pins is approximately the same as the distance between the axes of the pivot members 33 and 52 on the uprights of the mounting frame. The geometry of the linkage is such that if the bucket is approximately level at ground-engaging position and the hydraulic rams 49 are held against axial displacement, the bucket will be tilted slightly backward as it is elevated by the swingable boom.

The aligned openings 65 in the side wear plates 64 of the bucket are adapted to register with openings 90 in the lever-carrying plates 78 of the bucket-supporting arms, so as to receive temporary pins 91, Fig. 6, by which these arms can be locked to the bucket, as seen in Fig. 5, so as to facilitate attachment and detachment of the bucket.

The several hydraulic rams are suitably connected in the hydraulic system of the tractor so that they may be controlled by the tractor operator.

When the bucket assembly is to be attached to the swingable boom or lift frame, the bucket is rested on the ground and is preferably tilted backwardly through a small angle, as by a block or roller 92, Fig. 5. The bucket-supporting arms 67 are swung upwardly to the position shown in Fig. 5 and are held in this position by the pins 91 which are temporarily inserted through the openings 65 in the arm plates 78 and the openings 90 in the side wear plates 64 of the bucket. The link bars 82 are preferably held or propped in upwardly projecting position. The tractor, with its boom 29 in lowered position, is advanced to the rear of the bucket, whereupon the boom is elevated to enter the upper edge of the boom cross plate 34 into the notches 77 of the hook plates 76 on the bucket-supporting arms. A small additional lift of the boom will tilt the bucket toward level position, causing the lower edge of the boom cross plate to ride over the latch levers 80 and bringing the rear ends of the arm members 69 into abutment with the front face of the cross plate. The latch levers 80 then swing by gravity to locking position, the rounded cam-forming ends 81 of the levers assuming a wedging engagement with the lower edge of the cross plate. The link bars 82 are then swung rearwardly to engage the end hooks 87 thereof over the cross bar 48 of the rocker frame 46, and the locking hooks 88 are swung to pass under this cross bar. The positioning pins 91 are then removed, and the boom 29 is lowered.

In the operation of the machine as a loader, the tractor is propelled forwardly with the bucket 56 in level position and slidably resting on the ground. In its advance the boom-carried bucket will be pushed or crowded into the material, causing a load of the material to be deposited in the bucket. The boom 29 is then raised by the hydraulic rams 39, causing a slight backward tilting of the bucket. If desired, the bucket can be tilted farther in backward direction, as indicated in the intermediate broken line position of Fig. 2, by swinging the rocker frame 46 rearwardly by means of the link-forming hydraulic rams 49. The tractor is then moved to a discharging point as for dumping the load into a truck body or hopper 93, indicated by broken lines in Fig. 2. For this purpose the bucket is sufficiently elevated to pass over the truck body, and the rocker frame 46 is swung forwardly by the hydraulic rams 49, causing the bucket to tilt forwardly to discharging position, as indicated by broken lines in the uppermost bucket position of Fig. 2. In this tilting movement, the front edge of the bucket drops only a relatively short distance, because of the forward location of the pivot pins 71 on the bucket, so that it is not necessary to raise the bucket very far above the truck body. The tractor is then backed away from the truck and returned to the loading area, whereupon the bucket is lowered and restored to loading position. During transit of the tractor, the bucket may be held in a raised position a short distance above ground level so as not to obscure the vision of the operator.

When the bucket is to be detached from the machine, so as to be replaced by a bucket of different width and capacity, or by another implement, the bucket is tilted rearwardly and the locking pins 91 are inserted through the openings 65 and 90 to lock the bucket with respect to its supporting arms 67. The bucket is then lowered to the ground, being preferably supported on the block or roller 92, and the link bars 82 are unhooked from the rocker frame and swung forwardly. The latch levers 80 are swung to unlocking position, whereupon the boom 29 is lowered farther to separate the boom cross plate 34 from the bucket arms 67, and the tractor is backed away from the bucket.

A modified form of pivotal mounting for the loader bucket is shown in Fig. 8 and includes a pivot pin 101 which is welded or otherwise secured to a side wall reinforcing plate 72 and an outboard ear 73. A bucket-supporting arm 67' has secured thereto a head 104 with a bolted bearing cap 105, the head having a lubricating fitting 106. This construction avoids projecting ends on the pivot pins so as to minimize wear on the pins, and is applicable to both the bucket-supporting arms and the link bars. The construction of Fig. 8 is otherwise similar to that of Fig. 7.

Referring to the construction shown in Figs. 9 to 13, the tractor boom 29 has detachably secured thereto a material-working implement or unit 155 comprising a combined bulldozer and scarifier. The implement includes a pair of laterally spaced posts or supports 156 of hollow rectangular cross-section which are hung on the boom cross plate at the front of the plate, each post having a pair of parallel, vertically disposed hook plates 157 secured to opposite sides of its upper end portion and provided with downwardly opening notches 158 adapted to receive the upper edge of the boom cross plate. The hook plates are confined against lateral shifting by certain of the positioning lugs 38 on the cross plate. As best seen in Fig. 13, each notch 158 is slightly inclined, the bottom opening of the notch being rearward of the top of the notch. Angle members 159 are welded to the side walls of the posts just below the hook plates and have rear flanges bearing against the front face of the cross plate. Preferably, the rear face of each angle member projects slightly to the rear of the rear face of the associated post, as seen in Fig. 13.

A flat bar 160 is welded to a side of each post to extend in a forward and rearward direction and has a rear end portion projecting below the lower edge of the boom cross plate. A rear lug 161, Fig. 12, is welded to the rear face of the post in laterally spaced relation to the bar 160, and a horizontal cross pin 79 connects the lug and the bar and carries a latch lever 80, as in the implement of Fig. 1, the latch lever having a rounded cam-forming end 81 engageable with the lower edge of the boom cross plate. A bulldozer 162 with a removable lower blade section 163 extends crosswise in front of the lower portions of the posts 156 and has vertical rear supporting flanges 164 which enter between upper and lower sets of forwardly projecting mounting lugs 165 and 166 welded to the posts. A pivot pin 167 connects each flange 164 with the associated lower lugs 166, and a retaining pin 168 connects each flange with the upper lugs 165, each flange having selectively usable openings 169 to permit tilting of the blade to different angular positions.

The bulldozer blade forms a back rest for a horizontally extending swingably mounted scarifier beam 170 when the latter is in its operative position. The scarifier is of hollow rectangular cross-section and has rigidly secured thereto parallel supporting arms 171, such as angle bars, which are braced by welded angle members 172, and which suspend the scarifier beam in operative position. The upper ends of the supporting arms 171 are provided with ears 173 which are pivotally carried on pivot pins 174 secured to the front ends of the post bars 160 and to ears 175 welded to the posts 156 in parallel relation to the bars 160, each ear and adjacent bar end being connected by a welded reinforcing plate 176.

The upper and lower walls of the scarifier beam are provided with a series of spaced, transversely extending guide slots 177 in which detachably fit the flat shanks of angular scarifier teeth 178, the forwardly projecting lower ends of the teeth being provided with renewable wear tips 179. The rear edge of each scarifier tooth is provided with a series of notches 180 selectively receiving a locking block 181 which is clamped to the upper face of the scarifier beam by a screw 182. The scarifier teeth are thus held in longitudinally adjusted position. The number of teeth may be varied to suit the work at hand.

The scarifier beam is arranged to be swung upwardly out of operative position by actuating linkage, so as to permit individual use of the bulldozer blade. The linkage comprises pairs of suspension arms 183 pivotally mounted on pins 184 secured to the upper ends of the posts 156, and suspension links 185 which connect the outer ends of the arms 183 with the scarifier beam, each link being secured at its upper end to a pivot pin 186 on the associated arms 183 and being secured at its lower end to a pivot pin 187 carried by the associated angle bar 171 and by a lug 188 welded on the angle bar. The suspension arms 183 are raised and lowered by link bars 189 having their front ends secured to pivot pins 190 on intermediate portions of the suspension arms 183, and having hooks 191 at their rear ends engaged over the rocker frame cross bar 48. The hooked rear ends of the link bars are laterally confined by associated saddle blocks 54 on the rocker frame cross bar. The bottom portion of each hook 190 is parallel to the link axis and extends under the rocker frame cross bar.

When the combined bulldozer and scarifier implement or unit 155 is to be attached to the tractor, the implement is supported in backwardly tipped position with the link bars 189 swung forwardly, and the front cross plate 34 of the boom or lift frame is raised from the position seen in Fig. 13 to engage the upper edge of this plate in the notches 158 of the hook plates 157 on the implement posts, whereupon a slight lifting of the boom will cause the posts 156 to swing rearwardly against the boom cross plate, the latch levers 80 riding under the cross plate and engaging the lower edge of this plate with a wedging action to lock the posts to the plate. The link bars 189 are then swung rearwardly and are hooked onto the rocker frame cross bar 48, the latter being urged rearwardly by the hydraulic rams 49 to seat the hooks onto this cross bar. The device is then in the position shown in Fig. 9.

In the operation of the implement of Fig. 9, the tractor is driven forwardly, causing the scarifier teeth 178 to dig into the ground or pavement and break it up. The scarifier beam 170 rests against the front face of the bulldozer blade 162, thus resisting the thrust on the scarifier teeth. The bulldozer blade will also push ahead any material which extends higher than the lower edge of the blade, and will have a leveling action. In some cases, the front cross member of the boom may be lowered sufficiently to abut this member against the front portion of the tractor frame, or the posts 27, thus reducing the thrust on the boom.

When the bulldozer is to be used alone, the scarifier beam is raised to the inoperative position shown in broken lines in Fig. 10 by swinging the rocker frame 46 rearwardly by means of the hydraulic rams 49. The elevation of the blade is adjusted by the boom, and forward travel of the tractor will cause the blade to exert a scraping action. When required, the boom can be raised further to raise the bulldozer blade above ground level.

When the tractor is to be used for general traction purposes the implement unit is detached from the tractor, thus facilitating maneuvering of the tractor and avoiding projecting parts in front of the boom cross plate, which then forms a bumper.

Figures 3, 14:
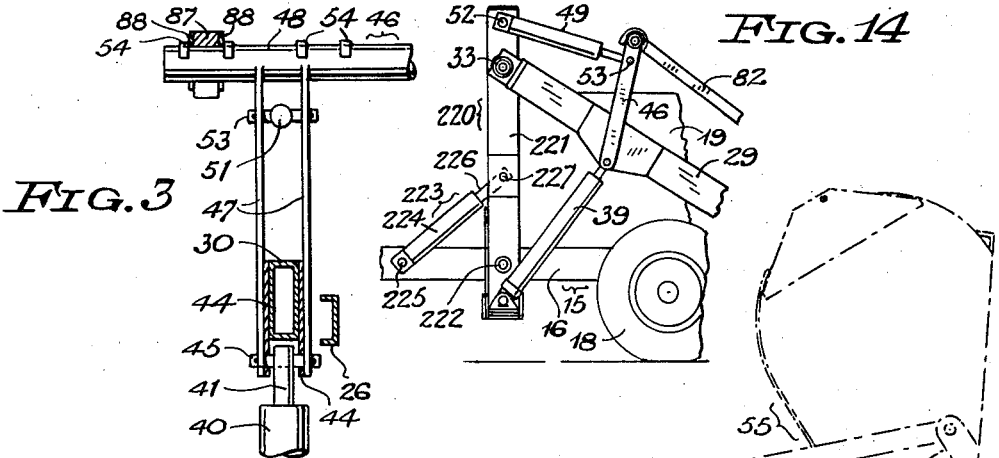
Fig. 3 is a detail sectional view taken generally on the line 3—3 of Fig. 2.
Fig. 14 is a side elevational view of a further modified form of tractor-mounted implement.
Figure 2:
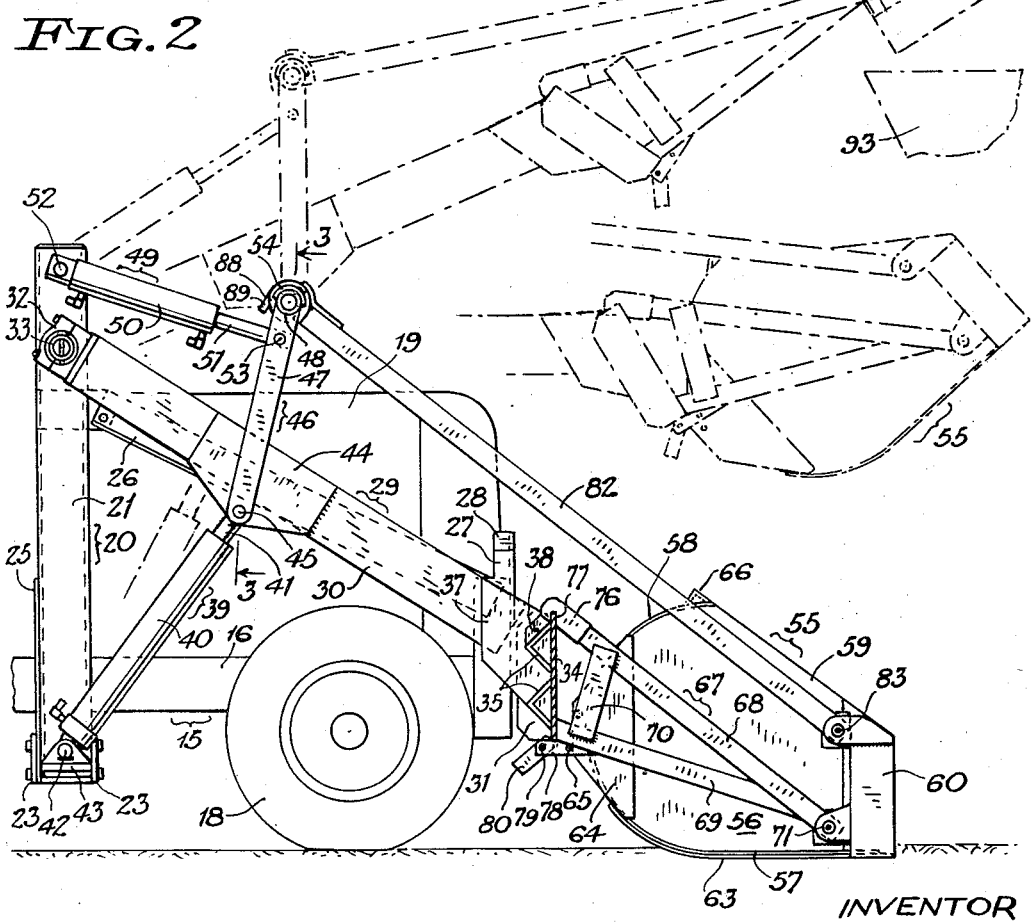
Fig. 2 is a side elevational view of the tractor-mounted implement of Fig. 1, a lowered position of a loader bucket thereof being shown in full lines, and elevated and tilted positions of the bucket being shown in broken lines.

In the form of the invention shown in Fig. 14, a mounting frame 220 on the tractor 15 has uprights 221 the lower portions of which are pivotally secured to the tractor frame at 222, permitting the frame to rock about a transverse horizontal axis. The mounting frame is swung by inclined hydraulic rams 223, one being shown, each having a cylinder 224 pivotally secured at 225 to the vehicle frame and having a piston rod 226 pivotally secured at 227 to the associated frame upright. Except for the pivotal support of the mounting frame, the device of Fig. 14 is the same as that of Fig. 1 and is adapted to carry various implements. The hydraulic rams 223 permit extension and retraction of the boom or lift frame 29 while the tractor is stationary, and also serve to hold the mounting frame in angularly adjusted position. In the case of a machine having an implement such as a loader bucket, the hydraulic rams 223 will provide a crowding action on the bucket without moving the tractor.

I claim:

1. In a vehicle mounted apparatus, a supporting structure connected to the vehicle, a vertically swingable boom having side arms pivotally connected to said supporting structure and having a cross member connecting the free end portions of said side arms, actuating means for said boom, an implement having a detachable hooked engagement with the upper portion of said cross member, and releasable boom-actuated retaining means comprising a latch member carried by said implement and engaging the lower portion of said cross member for holding said implement in hooked engagement with said cross member.

2. In a vehicle mounted apparatus, a supporting structure connected to the vehicle, a vertically swingable boom having side arms pivotally connected to said supporting structure and having a cross plate connecting the free end portions of said side arms, actuating means for said boom, an implement having a detachable hooked engagement with the upper edge of said cross plate, and releasable boom-actuated latch means comprising a latch lever carried by said implement and engaging the lower edge of said cross plate.

3. In a vehicle mounted apparatus, a supporting structure connected to the vehicle, a vertically swingable boom including side arms pivotally carried by said structure and further including a cross member connecting the outer end portions of said side arms, actuating means for said boom, a pair of forwardly projecting bucket-supporting arms detachably secured to said cross member, a loader bucket disposed between said last-named arms and pivotally carried thereby to tilt about a transverse axis, a rocker member pivotally mounted on the boom side arms and projecting upwardly therefrom, the pivotal axis of said rocker member being parallel to the pivotal axis of said boom, a link-forming fluid-pressure actuator having one end pivotally secured to said supporting structure at an axis above the pivotal axis of said boom and having its other end pivotally connected to said rocker member, and bucket-tilting linkage connecting said rocker member and said bucket, said linkage including link members having pivotal connections with the opposite sides of said bucket near the front thereof and above the pivotal axis of said bucket-supporting side arms.

4. In a vehicle mounted apparatus, a supporting structure connected to the vehicle, a vertically swingable boom including side arms pivotally carried by said structure and further including an implement-supporting cross member connecting the outer end portions of said side arms, actuating means for said boom, a rocker frame pivotally carried by said boom side arms on an axis parallel to the pivotal axis of said boom and spaced rearwardly of said cross member, said rocker frame projecting upwardly from its pivotal axis and including a swingable cross bar parallel to the pivotal axis of said frame, and a link-forming fluid-pressure actuator pivotally connecting said supporting structure and said rocker frame, said rocker frame cross bar being adapted for connection to implement-controlling linkage and having selectively active link-positioning parts spaced axially along said bar.

5. In a vehicle mounted apparatus, a vertically swingable vehicle-mounted boom, a pair of bucket-supporting arms detachably secured to the outer end portion of said boom to form extending parts of said boom, a loader bucket disposed between said arms and pivotally secured thereto for tilting movement about a transverse axis, and releasable locking means cooperating with said bucket and arms for restraining relative angular shifting of said bucket and arms, whereby to hold said arms in elevated position on said bucket in the detached condition of said bucket for facilitating attachment of said arms to said boom.

References Cited in the file of this patent

UNITED STATES PATENTS

| | | |
|---|---|---|
| 685,136 | Head | Oct. 22, 1901 |
| 2,190,164 | Seyller | Feb. 13, 1940 |
| 2,348,899 | Guignard | May 16, 1944 |
| 2,451,101 | Leschinsky | Oct. 12, 1948 |
| 2,753,059 | Pilch | July 3, 1956 |
| 2,807,379 | Pilch | Sept. 24, 1957 |